March 24, 1953          B. E. FINKBONE          2,632,595
BASKET
Filed Oct. 22, 1949          2 SHEETS—SHEET 1
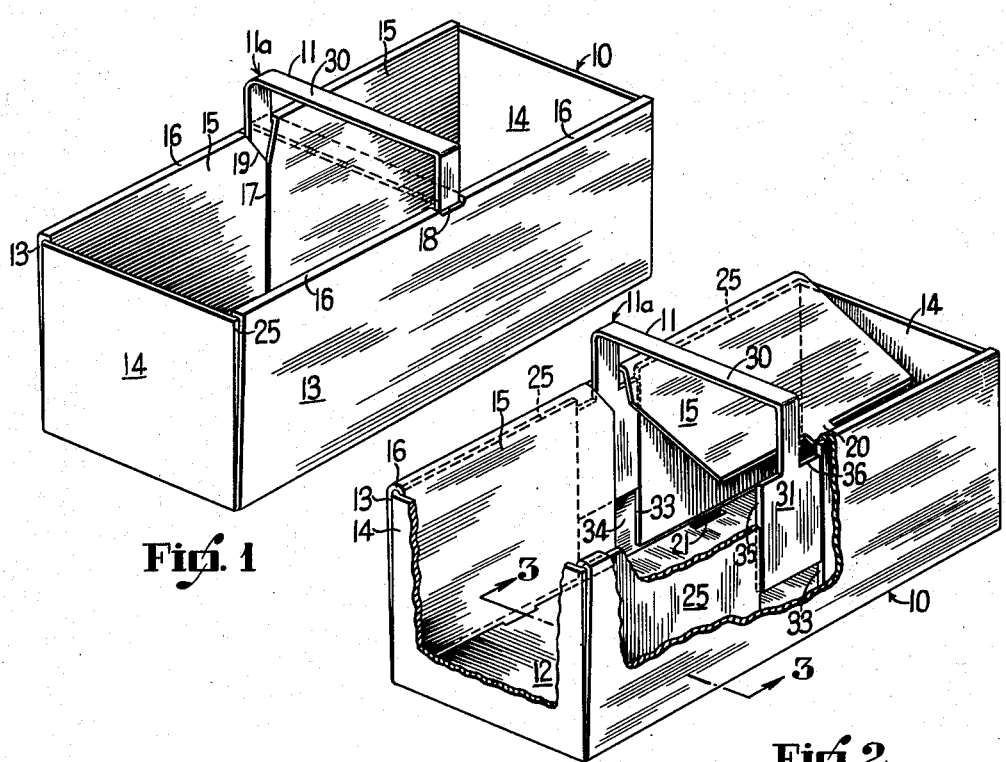
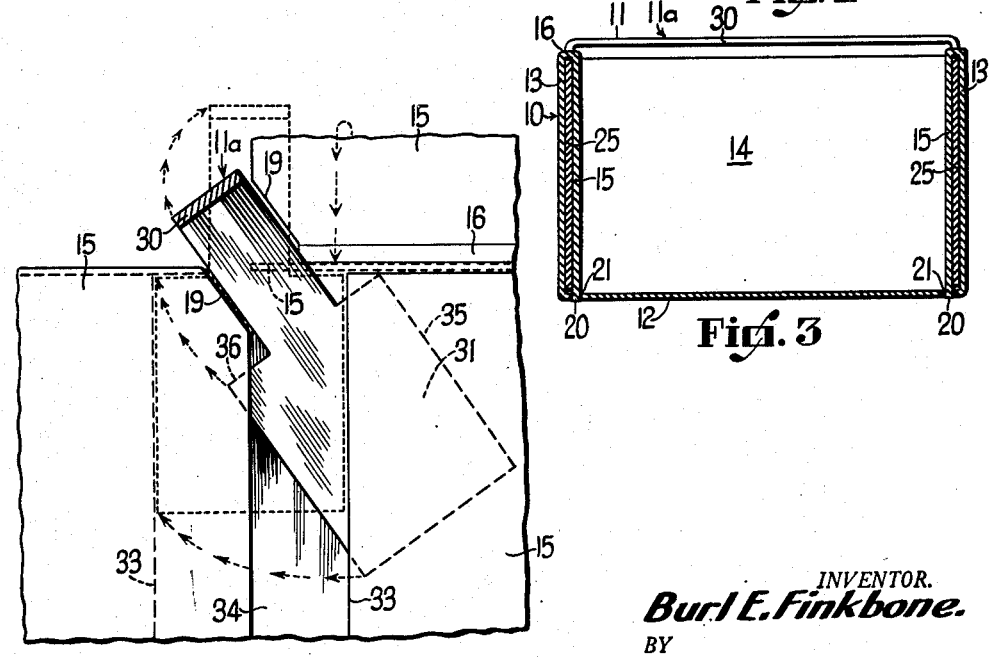
INVENTOR.
*Burl E. Finkbone.*
BY
*Cabell, Mahoney & Miller*
ATTORNEYS March 24, 1953 B. E. FINKBONE 2,632,595
BASKET
Filed Oct. 22, 1949 2 SHEETS—SHEET 2
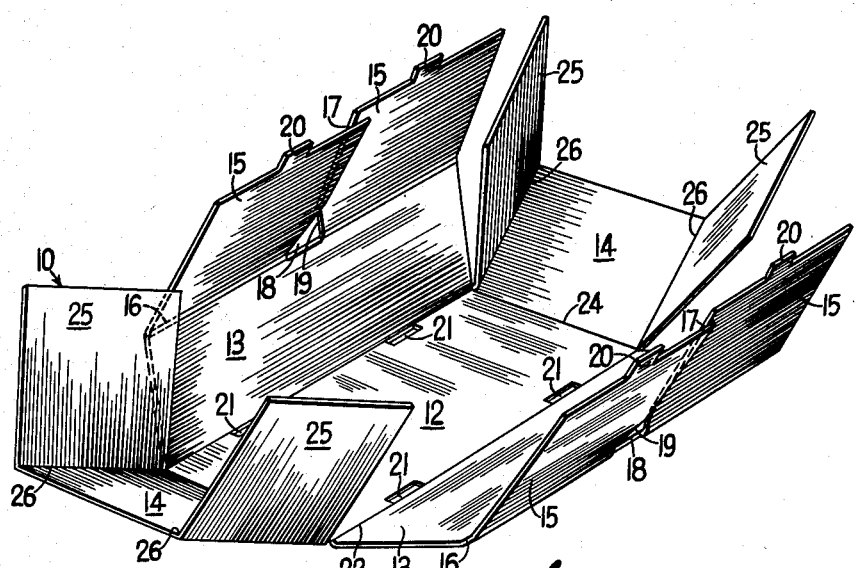
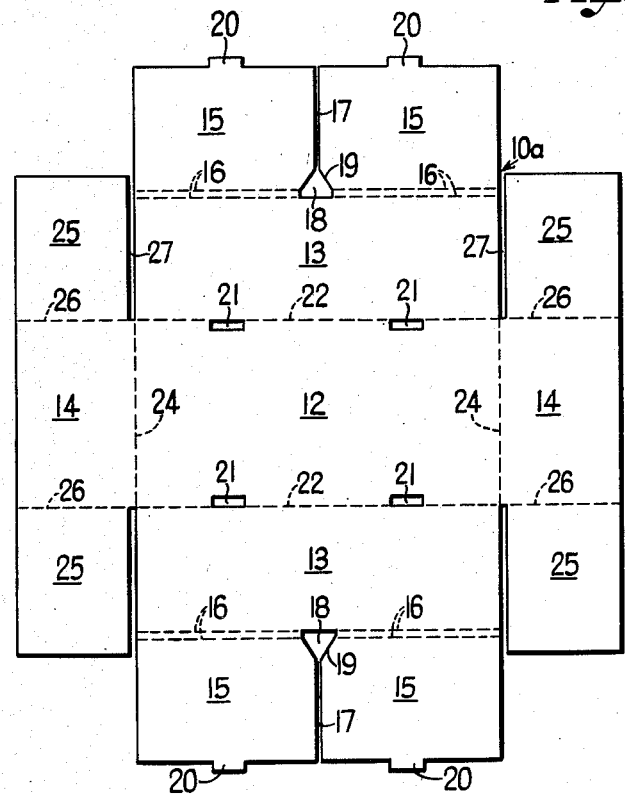
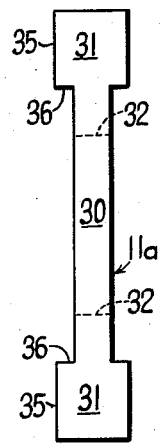
INVENTOR.
*Burl E. Finkbone.*
BY
*ATTORNEYS*

Patented Mar. 24, 1953

2,632,595

UNITED STATES PATENT OFFICE 2,632,595

BASKET

Burl E. Finkbone, Baltimore, Ohio, assignor to The Fairfield Paper and Container Company, Baltimore, Ohio, a corporation of Ohio Application October 22, 1949, Serial No. 123,006

3 Claims. (Cl. 229—52)

My invention relates to a basket. It has to do, more particularly, with a basket made of fiberboard, paperboard, corrugated board or similar material. More specifically, it relates to a basket of the type which has a handle to facilitate carrying thereof.

This general type of basket is used for bringing farm products, such as tomatoes, to the market, for displaying them, and for then carrying them to the ultimate point of consumption by the person buying them. Obviously, it is desirable for this use and other uses to provide a basket or container which has a handle that can be adjusted from an inoperative position where it is completely out of the way, so as to permit stacking, of the empty or full baskets, to an extended position where it can be used for carrying the basket and its contents. Furthermore, it is desirable that such a basket be supplied in knock-down condition, to facilitate shipping groups of them from the supplier, and that it be of such a design and construction that it can be set up readily. Attempts have been made in the prior art to provide such a basket but difficulty has been encountered in providing a suitable handle structure, especially insofar as its attachment to the body of the container is concerned.

It is the main object of my invention to provide a basket of the general type indicated formed of fiberboard, paperboard or similar material which includes a container or body having a handle of similar material secured thereto in a novel and efficient manner so that it can be adjusted quickly and easily, without jamming from an inoperative position, where it will not interfere with stacking of the containers, to an operative position, where it is extended and can be used readily to carry the basket.

Another object of my invention is to provide a basket of the type indicated which is supplied in knock-down condition to the user but can be set up easily with the handle attached without injury to the handle or body of the basket.

Still another object of my invention is to provide a basket of the type indicated wherein the handle is sturdy and is attached to the body of the container by sturdy means so that the handle structure can amply support the contents of the container.

Various other objects will be apparent.

The preferred embodiment of my invention is illustrated in the accompanying drawing wherein similar characters of reference designate corresponding parts and wherein:

Figure 1 is a perspective view of a basket made according to my invention showing it set up ready for use.

Figure 2 is a similar view of the blank cut away and not completely set up for purpose of illustration.

Figure 3 is a transverse sectional view taken along line 3—3 of Figure 2 but showing the handle in inoperative position.

Figure 4 is an enlarged detail, illustrating diagrammatically how the handle is positioned during setting up of the container.

Figure 5 is a perspective view showing the body blank being folded to set it up.

Figure 6 is a plan view of the body blank.

Figure 7 is a plan view of the handle blank.

With reference to the drawings, in Figure 1, I have illustrated my basket after it has been set up. The basket comprises a container or body 10 and a bail handle 11 which is attached to the body for vertical movement so that it can be moved from an inoperative position, close to the top edge of the body, as shown by the dotted lines in Figure 1, to an operative position, where it is extended upwardly from the body as shown by the full lines in Figure 1, and can be used for carrying the body.

The body or container 10 is formed from a flat blank of paperboard, fiberboard, corrugated board or similar material, indicated by the numeral 10a in Figure 6. This blank is cut and scored to form the bottom 12 having the attached side walls 13 and end walls 14 which are adapted to be swung upwardly into upstanding relationship relative to the bottom.

The edge of each side wall 13 is provided with a pair of locking flaps 15 extending outwardly therefrom and attached thereto along the hinge joints 16 formed by spaced parallel fold lines. These locking flaps 15 together extend the full length of the side walls 13, being separated only by a narrow slit 17. The slit 17 extends outwardly from a handle-receiving opening 18 formed at the hinge joints. It will be noted that the corner of each flap 15 adjacent the opening 18 is beveled or cut off as indicated at 19. Each of the locking flaps 15 is provided with a locking tab 20 on its outer edge which is adapted to fit into a cooperating slot 21 formed in the bottom 12 at the score line 22 where the side wall 13 is joined to the bottom. It will be understood that the locking flaps 15 are of the same depth as the side walls 13.

Each end wall 14 is joined to the bottom 12 along a score line 24. The end of each of these end walls 14 is provided with a guide flap 25 which is joined thereto along a score line 26. It will be noted that each flap 25 is separated from the side wall 13 and adjacent locking flap 15 by a slot 27. Each of the flaps 25 is of a depth corresponding substantially to that of the side wall 13 and of a length less than one-half of that of the side wall for a purpose which will be apparent hereinafter.

The handle blank 11a used in forming the handle 11 is illustrated in Figure 7. This blank is of material similar to the body blank 10a. It includes a central gripping section 30 which is relatively narrow and which has integral guide and attaching portions 31 formed on its ends. These portions 31 are of substantially square outline. Transverse score lines 32 are provided in the central portion 30 to facilitate bending at these points, these score lines being spaced apart a distance equal to the width of the bottom 12 or blank 10a, that is, a distance equal to the spacing of the score lines 22 of the blank 10a.

When the basket is shipped from the manufacturer to the user, both the body blank and handle blank will be in flat form, as indicated in Figures 6 and 7. Thus, shipping will be greatly facilitated.

When the basket is to be set up, the body blank 10a is folded in the manner illustrated in Figure 5. The handle blank 11a is folded along the lines 32. In folding the body blank, the side walls 13 and the end walls 14 are brought into upstanding position. The guide flaps 25 on each end wall 14 are folded towards each other as the end wall is swung upwardly and such guide flaps are swung inwardly over the bottom 12, as the end wall is swung upwardly, until they are positioned along the inner sides of the side walls 13. At this time, the locking flaps 15 will not yet be swung downwardly into final position. Since each of the guide flaps 25 is less than one-half the length of the side wall 13, it will be apparent that the inner edges 33 of the guide flaps will be spaced from each other and will produce a vertically disposed guide channel 34 at each of the side walls. The flaps 25 will be of such length that this channel will be of proper width to snugly receive the guide portions 31 of the handle so that the edges 33 of the flaps will serve as vertical guide edges which will cooperate with the vertical guide edges 35 formed on the handle.

In positioning the handle 11a on the basket, the two flaps 15 at one end of the body and on opposite side walls are folded downwardly into final position and are locked in position by their tabs 20 and cooperating openings 21. This will also lock in place the two cooperating guide flaps 25 at that end. With the other two locking flaps 15 still extending upwardly out of the body, the handle 11a is positioned on the body by inserting the guide portions 31 thereof in the two guide channels 34 at the upper ends thereof. Then, as shown by full lines in Figure 4, the portions 31 are swung laterally out of the guide channels 34 between the vertically disposed guide flaps 25 and side wall 13 at the end where the flaps 15 are not yet folded down into final position. The openings 18 are of sufficient length to permit the necessary lateral swinging of the upstanding parts of the handle. In this laterally tilted position of the handle, it is now possible to swing down the remaining two locking flaps 15, the cut off corners 19 of such flaps permitting swinging the flaps into final position without interference with the upstanding parts of the handle and without damaging or tearing the flaps or handle. Before these two locking flaps 15 are locked in position by the tabs 20 and openings 21, the portions 31 of the handle are moved into the guide channels 34, as indicated by the dotted line position in Figure 4. Thereafter, the portions 31 will merely move vertically in the guide channels 34 and will be prevented from cocking therein. The edges 35 of portions 31 will contact and cooperate with the edges 33 of the guide channels and portions 31 cannot move between flaps 25 and side walls 13 because locked flaps 15 hold flaps 25 tightly against side walls 13.

Portions 31 are wider than openings 18 so that shoulders 36 on the upper edges thereof contact the lower sides of hinge joints 16 adjacent the ends of the openings whenever the handle is pulled upwardly.

If the baskets are to be shipped in set up condition, the handles 11 are moved downwardly to inoperative position to permit stacking. When the baskets are to be filled, the handles 11 may be pulled upwardly out of the way. After the baskets are filled, the handles may be used to place the baskets in a truck or other vehicle in stacked condition, it being understood that as each basket is positioned in a stack, the handle is forced downwardly to be out of the way of the next basket to be piled thereon. At the market or the display point, the baskets may be used to display the contents and when a customer makes a purchase of a basketful of the displayed commodity, he may pull the handle upwardly and then use it to carry the basket and its contents.

It will be apparent from the above description that I have provided a basket made of paperboard, fiberboard, corrugated board or similar material having many advantages. A number of these advantages have been discussed and others will be apparent.

Having thus described my invention, what I claim is:

1. A basket of the type described comprising a body formed from a blank of paperboard or similar material cut and scored to form a bottom with attached upstanding side and end walls, each of said side walls having attached to its upper edge a pair of locking flaps which are folded downwardly and inwardly along such side wall, the inner edges of said flaps being closely adjacent with a narrow slit therebetween and a handle-receiving opening being formed at the upper end of said slit at the fold line of the flaps and side wall, each of the end walls having guide flaps on each end thereof which are folded and swung inwardly along the side walls before the locking flaps are folded downwardly and inwardly as indicated, said guide flaps being of a height substantially the same as said side walls and being of such length that when the guide flaps of opposite end walls are positioned as indicated the opposed guide flaps will be spaced apart in parallel relationship so that their straight inner edges are vertically disposed and form a vertical guide channel at each upstanding side wall behind said locking flaps, a bail handle formed from a blank of paperboard or similar material cut and scored to form a central gripping section and guide and attaching portions at each end thereof, said central gripping section of the handle extending upwardly through the handle-receiving openings at the side walls, said guide portions being of greater width than said handle-receiving openings so as not to pull upwardly therethrough and having straight vertically disposed parallel side edges fitting snugly in said vertical guide channels so that the inner straight vertical edges of said guide flaps serve to guide vertical movement of the handle guide portions by cooperating with the straight side edges thereof and prevent cocking of the handle during vertical movement thereof, said guide portions having their inner faces covered by said locking flaps which extend inwardly over said channel.

2. A basket of the type set forth in claim 1 wherein the corner of each locking flap at said handle-receiving opening is removed to facilitate setting up of the basket.

3. A basket according to claim 2 wherein each of the locking flaps extends into contact with said bottom and has a downwardly extending locking tab fitting into a slot formed in said bottom.

BURL E. FINKBONE.

REFERENCES CITED

The following references are of record in the file of this patent:

UNITED STATES PATENTS

| Number | Name | Date |
|---|---|---|
| 584,044 | Little | June 8, 1897 |
| 1,860,349 | Larkin | May 31, 1932 |
| 2,036,645 | Schell | Apr. 7, 1936 |
| 2,039,971 | Meinhardt | May 5, 1936 |
| 2,086,209 | Brooks | July 6, 1937 |
| 2,354,867 | Larkin | Aug. 1, 1944 |
| 2,468,951 | Barter | May 3, 1949 |